(12) United States Patent
Chan et al.

(10) Patent No.: US 11,364,942 B2
(45) Date of Patent: Jun. 21, 2022

(54) STOP ANNOUNCEMENT SYSTEM AND METHOD THEREFOR

(71) Applicant: SMART ALIGHTING LIMITED, Hong Kong (CN)

(72) Inventors: Tak Ko Chan, Hong Kong (CN); Tsz Kiu Jason Chiu, Hong Kong (CN); Yuk Ming Christopher Yeong, Hong Kong (CN)

(73) Assignee: STARBERRY LIMITED, Hong Kong (CN)

( * ) Notice: Subject to any disclaimer, the term of this patent is extended or adjusted under 35 U.S.C. 154(b) by 152 days.

(21) Appl. No.: 16/614,747

(22) PCT Filed: Aug. 3, 2018

(86) PCT No.: PCT/CN2018/098561
§ 371 (c)(1),
(2) Date: Nov. 18, 2019

(87) PCT Pub. No.: WO2019/056873
PCT Pub. Date: Mar. 28, 2019

(65) Prior Publication Data
US 2020/0207386 A1      Jul. 2, 2020

(30) Foreign Application Priority Data

Sep. 22, 2017   (CN) .......................... 201710866785.4

(51) Int. Cl.
| G08B 3/10 | (2006.01) |
| B61L 15/00 | (2006.01) |
| B61L 3/12 | (2006.01) |

(52) U.S. Cl.
CPC ........... *B61L 15/0027* (2013.01); *B61L 3/125* (2013.01); *G08B 3/10* (2013.01)

(58) Field of Classification Search
CPC ........ B61L 15/0027; B61L 3/125; B61L 3/00; B61L 3/02; B61L 3/08; B61L 3/12;
(Continued)

(56) References Cited

U.S. PATENT DOCUMENTS

2016/0142964 A1 *   5/2016   Todasco .............. H04W 40/244
                                                            455/41.2

FOREIGN PATENT DOCUMENTS

| CN | 201556307 | 8/2010 |
| CN | 105451186 | 3/2016 |

(Continued)

*Primary Examiner* — Hai Phan
*Assistant Examiner* — Anthony D Afrifa-Kyei
(74) *Attorney, Agent, or Firm* — Weiss & Moy, P.C.; Jeffrey D. Moy

(57) ABSTRACT

The present invention is adapted to the technical field of communication, and provides a stop announcement system and a method thereof. The stop announcement system comprises: at least one platform beacon disposed on at least one stop site of a transportation means for identifying a position message of the stop site, and sending a message of position change according to the position change of the transportation means relative to the stop site; and at least one stop announcement device disposed on the transportation means for receiving the message of position change and sending a corresponding stop announcement message when the transportation means moves into a range of a preset communication distance of the at least one platform beacon; wherein the stop announcement message at least comprises a prompt message of entering into the stop site and/or a prompt message of stopping on the stop site and/or a prompt message of leaving the stop site. By virtue of this, the present invention achieves timely and accurately stop announcement in operation of the transportation means.

17 Claims, 3 Drawing Sheets

(58) Field of Classification Search
CPC ..... B61L 15/0045; B61L 25/025; G08B 3/10; G08B 29/123; G08G 1/133; H04W 4/02; H04W 4/42
See application file for complete search history.

(56) References Cited

FOREIGN PATENT DOCUMENTS

| | | |
|---|---|---|
| CN | 105489050 | 4/2016 |
| CN | 105722034 | 6/2016 |

* cited by examiner

STOP ANNOUNCEMENT SYSTEM AND METHOD THEREFOR

TECHNICAL FIELD

The present invention relates to the technical field of communication, and in particular, relates to a stop announcement system and a method thereof.

BACKGROUND OF THE INVENTION

When most of railways in major cities of the world enter into cities, since they need to give the road to other transportation means and existing buildings, the railway lines run under the ground, such that passengers in railway carriages can only see outwardly walls of a railway tunnel. Moreover, the Global Positioning System (GPS) in the prior art cannot provide positions of the railway carriages to mobile smart devices of the passengers in the railway carriages that run under the ground, and the passengers also cannot determine situation, distance and time to be run when the railway train arrives at the station depending on sceneries outside windows. In another case, the GPS also cannot accurately calculate a position of the current detection device. According to a standard of the US government, an error of an observed value of the OPS is four root mean squares (RMS), and it may not accurately calculate whether the train is entering into a stop site or is running on another rail beside the stop site only depending on the GPS. Generally, if a passenger intends to get off at the next stop, before the carriage where the passenger is enters into the stop site, as for passengers of the train that runs in the tunnel, they only see outwardly the dark walls of the tunnel, and after the carriage enters into the stop site of the station, in other words, after it leaves the railway tunnel, the passengers can see sceneries outside the tunnel. At this time, the passenger can determine to have entered into the stop site, and can prepare to get off. In the current case, passengers in an engine carriage (a first carriage) firstly enter into the stop site, i.e., they firstly see sceneries at the stop site, and the passengers also can prepare to get off. Meanwhile, passengers in a tail carriage (such as, an eighth carriage) are still in the tunnel and when the train slows down and the whole train stops on the stop site, i.e., almost the eighth carriage has just left the tunnel, the passengers therein see sceneries leaving the tunnel. In the above case, there is a large time difference of entering the stop site of the station visually determined by the passengers in the first to eighth carriages.

In the same case, due to an error of the GPS, one improvement method also can efficiently provide service of in and out of the station to passengers in the transportation means that runs on the ground, i.e., a train, a light rail, and an articulated or a longer transportation means that run on the ground also need a preferable system and method to remind the passengers.

In the prior art, a device within the train carriage is used to send local service including broadcast of arrival and situation with sound and words on a display screen to passengers. Also, the prior arts are also available, including the Chinese patent application CN201610196515.2 with a title "BLUETOOTH BEACON-BASED ARRIVAL PROMPTING METHOD AND ARRIVAL PROMPTING DEVICE", which discloses sending station information to an earphone within a communication range utilizing a Bluetooth beacon on a public transportation. The invention sends station information when detecting the stop by virtue of a detection device on the public transportation, or detecting the public transportation via a detection device of the stop. When the prior art uses the detection device on the public transportation, it detects voluntarily if the public transportation is running in the tunnel and the GPS cannot be used. If the devices of the public transportation and the stop are used for communication, a prediction of arrival is acquired, i.e., it is equivalent to that there is a quite long time difference of the arrival information obtained by the first to eighth carriages in the background art.

To sum up, the available stop announcement technology obviously has inconveniences and deficiencies in practical use, so it is necessary to make improvement.

SUMMARY OF THE INVENTION

With respect to the above deficiencies, an object of the present invention is to provide a stop announcement system and a method thereof, which achieves timely and accurately stop announcement in operation of the transportation means.

In order to achieve the above object, the present invention provides a stop announcement system, comprising:

at least one platform beacon disposed on at least one stop site of a transportation means for identifying a position message of the stop site, and sending a message of position change according to the position change of the transportation means relative to the stop site; and at least one stop announcement device disposed on the transportation means for receiving the message of position change and sending a corresponding stop announcement message when the transportation means moves into a range of a preset communication distance of the at least one platform beacon;

wherein the stop announcement message at least comprises a prompt message of entering into the stop site and/or a prompt message of stopping on the stop site and/or a prompt message of leaving the stop site.

According to the stop announcement system, the stop announcement system further comprises:

at least one transportation means beacon disposed on the transportation means; the transportation means beacon receiving the message of position change sent from the at least one platform beacon, and sending the message of position change to the at least one stop announcement device when the transportation means moves into the range of the preset communication distance of the at least one platform beacon.

According to the stop announcement system, the transportation means comprises N carriages; a first carriage to a Nth carriage are sequentially connected from a head to a tail of the transportation means; the stop announcement system comprises:

a plurality of the stop announcement devices respectively disposed in each of the carriages; the stop announcement devices disposed in the first carriage to the Nth carriage being a first stop announcement device to a Nth stop announcement device sequentially;

the first stop announcement device to the Nth stop announcement device sequentially receiving a message of a first position change sent from the at least one platform beacon, and sending a prompt message of entering into the stop site when the first carriage to the Nth carriage sequentially move into the range of the preset communication distance of the at least one platform beacon;

the first stop announcement device to the Nth stop announcement device sequentially receiving a message of a second position change sent from the at least one platform beacon, and sending a prompt message of stopping on the stop site when the first carriage to the Nth carriage sequentially move into the range of the preset communication distance of the at least one platform beacon, and stop moving; and the first stop announcement device to the Nth stop announcement device sequentially receiving a message of a third position change sent from the at least one platform beacon, and sending a prompt message of leaving the stop site when the first carriage to the Nth carriage continue to advance from a state of stopping moving to sequentially move out of the range of the preset communication distance of the at least one platform beacon.

According to the stop announcement system, the at least one stop site comprises N platform carriage zones, and comprises a first platform carriage zone to a Nth platform carriage zone sequentially connected from the head to the tail of the at least one stop site; the stop announcement system comprises:

N platform beacons respectively disposed in each of the platform carriage zones, each of the platform carriage zones having a length equal to a length of each of the carriages; the N platform beacons being respectively a first platform beacon to a Nth platform beacon; ranges of preset communication distances of the first platform beacon to the Nth platform beacon being respectively a range of a preset communication distance of the first platform beacon to a range of a preset communication distance of the Nth platform beacon;

the first stop announcement device to the Nth stop announcement device sequentially and respectively receiving a message of a fourth position change sent from the corresponding Nth platform beacon to first platform beacon, and correspondingly sending a prompt message of entering into the Nth platform carriage zone to the first platform carriage zone of the stop site when the first carriage to the Nth carriage advance to sequentially pass the range of the preset communication distance of the Nth platform beacon to the range of the preset communication distance of the first platform beacon;

the first stop announcement device to the Nth stop announcement device sequentially and respectively receiving a message of a fifth position change sent from the corresponding Nth platform beacon to first platform beacon, and correspondingly sending prompt messages of the Nth platform beacon to the first platform beacon stopping on the stop site when the first carriage to the Nth carriage advance to sequentially pass the range of the preset communication distance of the Nth platform beacon to the range of the preset communication distance of the first platform beacon, and stop moving; and the first stop announcement device to the Nth stop announcement device sequentially and respectively receiving a message of a sixth position change sent from the corresponding first platform beacon to Nth platform beacon, and correspondingly sending a prompt message of leaving the first platform carriage zone to the Nth platform carriage zone of the stop site when the first carriage to the Nth stop announcement device sequentially continue to advance from the state of stopping moving to move out of the first platform carriage zone to the Nth platform carriage zone.

According to the stop announcement system, the at least one transportation means beacon comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the first position change, the message of the second position change and the message of the third position change sent from the at least one platform beacon, and send the message of the first position change, the message of the second position change and the message of the third position change to the first stop announcement device to the Nth stop announcement device corresponding to the first carriage to the Nth carriage where the first train beacon to the Nth train beacon are located.

According to the stop announcement system, the at least one transportation means beacon comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the fourth position change, the message of the fifth position change and the message of the sixth position change sent from the first platform beacon to the Nth platform beacon, and send the message of the fourth position change, the message of the fifth position change and the message of the sixth position change to the first stop announcement device to the Nth stop announcement device corresponding to the first carriage to the Nth carriage where the first train beacon to the Nth train beacon are located.

According to the stop announcement system, the message of position change comprises current position message of the transportation means and current position change of the transportation means; the position message comprises a platform beacon short range communication signal of the platform beacon;

the stop announcement system further comprises:

a storage device for storing a platform beacon database of the platform beacon; the platform beacon database comprising a stop site corresponding to the platform beacon short range communication signal, and name and/or geographic position of the platform carriage zone; and a transportation means position change detection device for detecting a position change of the transportation means relative to the platform; the position change comprises slowing down to the range of the preset communication distance of the platform beacon, stopping in the range of the preset communication distance of the platform beacon, and speeding up to leave the range of the preset communication distance of the platform beacon;

wherein after the stop announcement device receives the position message, the corresponding stop site, and the name and/or geographic position of the platform carriage zone are searched in the platform beacon database according to the platform beacon short range communication signal; when the transportation means position change detection device detects the position change to slowing down to the range of the preset communication distance of the platform beacon, a prompt message of entering into the stop site is sent; or when the transportation means position change detection device detects the position change to stopping in the range of the preset communication distance of the platform beacon, a prompt message of stopping on the stop site is sent; or when the transportation means position change detection device detects the position change to speeding up to leave the range of the preset communication distance of the platform beacon, a prompt message of leaving the stop site is sent;

wherein the prompt messages all comprise the corresponding stop site, and the name and/or geographic position of the platform carriage zone that are searched;

N is an integer greater than and equal to 2.

According to the stop announcement system, the storage device further stores a train beacon database of the train beacon; the train beacon database comprises a train short range communication signal corresponding to the train beacon, and name of a train carriage corresponding to the train short range communication signal;

the storage device is disposed in the platform beacon, or disposed in the stop announcement device;

the transportation means position change detection device is disposed in the platform beacon, or disposed in the train beacon.

According to the stop announcement system, the N train beacons are connected via network communication;

when the first train beacon receives the message of the first position change or the message of the second position change or the message of the third position change, the message of the first position change or the message of the second position change or the message of the third position change is sequentially transmitted and sent from a second train beacon to the Nth train beacon; or when each of the stop announcement devices receives two or more signals of the message of the first position change or the message of the second position change or the message of the third position change simultaneously, each of the stop announcement devices select to read the position information with strongest signal.

According to the stop announcement system, the N train beacons are connected via network communication;

when the first train beacon receives the message of the fourth position change or the message of the fifth position change or the message of the sixth position change, the message of the fourth position change or the message of the fifth position change or the message of the sixth position change is sequentially transmitted and sent from a second train beacon to the Nth train beacon; or when each of the stop announcement devices receives two or more signals of the message of the fourth position change or the message of the fifth position change or the message of the sixth position change simultaneously, each of the stop announcement devices select to read the position information with strongest signal.

According to the stop announcement system, the stop announcement device further judges the closest carriage exit of the transportation means from a destination, and sends a prompt message of the closest carriage exit of the transportation means from the destination according to a preset destination and the message of position change that is received currently; or a plurality of the stop announcement devices set an optimized collective destination, and sends a prompt message of the optimized collective destination according to the message of position change that is each received currently.

According to the stop announcement system, the transportation means is a rail train or a railless train;

the stop site is a stop site of the transportation means disposed in an undersea tunnel.

According to the stop announcement system, each of the platform beacons is disposed in each of the corresponding platform carriage zones;

each of the train beacons is disposed in each of the corresponding carriages;

each of the stop announcement devices is fixedly disposed on a communication device in each of the corresponding carriages; or each of the stop announcement devices is a mobile communication terminal;

the range of the preset communication distance is 20 to 40 meters.

According to the stop announcement system, the platform beacon is 1.5 to 3 meters from the ground;

the train beacon is 1.5 to 3 meters from the ground of the carriage;

the platform beacon, the stop announcement device and the train beacon are all short range communication devices.

According to the stop announcement system, the platform beacon is 2 meters from the ground;

the train beacon is 2 meters from the ground of the carriage;

the short range communication devices are radio frequency communication devices, RF communication devices, wifi communication devices, Bluetooth communication devices, and audio communication devices.

According to the stop announcement system, the platform beacon, the stop announcement device and the train beacon are all Bluetooth communication devices;

the platform beacon is a platform Bluetooth beacon;

the train beacon is a carriage Bluetooth beacon.

In order to achieve another inventive object of the present invention, the present invention further provides A method of implementing stop announcement using the stop announcement system, comprising:

at least one platform beacon sending a message of position change according to the position change of the transportation means relative to the stop site; and at least one stop announcement device receiving the message of position change and sending a corresponding stop announcement message when the transportation means moves into a range of a preset communication distance of the at least one platform beacon;

wherein the stop announcement message at least comprises a prompt message of entering into the stop site and/or a prompt message of stopping on the stop site and/or a prompt message of leaving the stop site.

According to the method, the stop announcement system further comprises at least one transportation means beacon disposed on the transportation means;

the method further comprises:

the transportation means beacon receiving the message of position change sent from the at least one platform beacon, and sending the message of position change to the at least one stop announcement device when the transportation means moves into the range of the preset communication distance of the at least one platform beacon.

According to the method, the transportation means comprises N carriages; a first carriage to a Nth carriage are sequentially connected from a head to a tail of the transportation means; the stop announcement system comprises:

a plurality of the stop announcement devices respectively disposed in each of the carriages; the stop announcement devices disposed in the first carriage to the Nth carriage being a first stop announcement device to a Nth stop announcement device sequentially;

the method further comprises:

the first stop announcement device to the Nth stop announcement device sequentially receiving a message of a first position change sent from the at least one platform beacon, and sending a prompt message of entering into the stop site when the first carriage to the Nth carriage sequentially move into the range of the preset communication distance of the at least one platform beacon;

the first stop announcement device to the Nth stop announcement device sequentially receiving a message of a second position change sent from the at least one platform beacon, and sending a prompt message of stopping on the stop site when the first carriage to the Nth carriage sequentially move into the range of the preset communication distance of the at least one platform beacon, and stop moving; and the first stop announcement device to the Nth stop announcement device sequentially receiving a message of a third position change sent from the at least one platform beacon, and sending a prompt message of leaving the stop site when the first carriage to the Nth carriage continue to advance from a state of stopping moving to sequentially move out of the range of the preset communication distance of the at least one platform beacon.

According to the method, the at least one stop site comprises N platform carriage zones, and comprises a first platform carriage zone to a Nth platform carriage zone sequentially connected from the head to the tail of the at least one stop site; the stop announcement system further comprises:

N platform beacons respectively disposed in each of the platform carriage zones, each of the platform carriage zones having a length equal to a length of each of the carriages; the N platform beacons being respectively a first platform beacon to a Nth platform beacon; ranges of preset communication distances of the first platform beacon to the Nth platform beacon being respectively a range of a preset communication distance of the first platform beacon to a range of a preset communication distance of the Nth platform beacon;

the method comprises:

the first stop announcement device to the Nth stop announcement device sequentially and respectively receiving a message of a fourth position change sent from the corresponding Nth platform beacon to first platform beacon, and correspondingly sending a prompt message of entering into the Nth platform carriage zone to the first platform carriage zone of the stop site when the first carriage to the Nth carriage advance to sequentially pass the range of the preset communication distance of the Nth platform beacon to the range of the preset communication distance of the first platform beacon;

the first stop announcement device to the Nth stop announcement device sequentially and respectively receiving a message of a fifth position change sent from the corresponding Nth platform beacon to first platform beacon, and correspondingly sending a prompt message of stopping on the Nth platform carriage zone to the first platform carriage zone of the stop site when the first carriage to the Nth carriage advance to sequentially pass the range of the preset communication distance of the Nth platform beacon to the range of the preset communication distance of the first platform beacon, and stop moving; and the first stop announcement device to the Nth stop announcement device sequentially and respectively receiving a message of a sixth position change sent from the corresponding first platform beacon to Nth platform beacon, and correspondingly sending a prompt message of leaving the first platform carriage zone to the Nth platform carriage zone of the stop site when the first carriage to the Nth stop announcement device sequentially continue to advance from the state of stopping moving to move out of the first platform carriage zone to the Nth platform carriage zone.

According to the method, the at least one transportation means beacon comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

in the method: the first train beacon to the Nth train beacon respectively receive the message of the first position change, the message of the second position change and the message of the third position change sent from the at least one platform beacon, and send the message of the first position change, the message of the second position change and the message of the third position change to the first stop announcement device to the Nth stop announcement device corresponding to the first carriage to the Nth carriage where the first train beacon to the Nth train beacon are located.

According to the method, the at least one transportation means beacon comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the fourth position change, the message of the fifth position change and the message of the sixth position change sent from the first platform beacon to the Nth platform beacon, and send the message of the fourth position change, the message of the fifth position change and the message of the sixth position change to the first stop announcement device to the Nth stop announcement device corresponding to the first carriage to the Nth carriage where the first train beacon to the Nth train beacon are located.

According to the method, the message of position change comprises current position message of the transportation means and current position change of the transportation means; the position message comprises a platform beacon short range communication signal of the platform beacon;

the system further comprises:

a storage device for storing a platform beacon database of the platform beacon; the platform beacon database comprising a stop site corresponding to the platform beacon short range communication signal, and name and/or geographic position of the platform carriage zone; and a transportation means position change detection device for detecting a position change of the transportation means relative to the stop site; the position change comprises slowing down to the range of the preset communication distance of the platform beacon, stopping in the range of the preset communication distance of the platform beacon, and speeding up to leave the range of the preset communication distance of the platform beacon;

in the method: after the stop announcement device receives the position message, the corresponding stop site, and the name and/or geographic position of the platform carriage zone are searched in the platform beacon database according to the platform beacon short range communication signal; when the transportation means position change detection device detects the position change to slowing down to the range of the preset communication distance of the platform beacon, a prompt message of entering into the stop site is sent; or when the transportation means position change detection device detects the position change to stopping in the range of the preset communication distance of the platform beacon, a prompt message of stopping on the stop site is sent; or when the transportation means position change detection device detects the position change to speeding up to leave the range of the preset communication distance of the platform beacon, a prompt message of leaving the stop site is sent;

wherein the prompt messages all comprise the corresponding stop site, and the name and/or geographic position of the platform carriage zone that are searched;

N is an integer greater than and equal to 2.

According to the method, the storage device further stores a train beacon database of the train beacon; the train beacon database comprises a train short range communication signal corresponding to the train beacon, and name of a train carriage corresponding to the train short range communication signal;

the storage device is disposed in the platform beacon, or disposed in the stop announcement device;

the transportation means position change detection device is disposed in the platform beacon, or disposed in the train beacon.

According to the method, the N train beacons are connected via network communication;

when the first train beacon receives the message of the first position change or the message of the second position change or the message of the third position change, the message of the first position change or the message of the second position change or the message of the third position change is sequentially transmitted and sent from a second train beacon to the Nth train beacon; or when each of the stop announcement devices receives two or more signals of the message of the first position change or the message of the second position change or the message of the third position change simultaneously, each of the stop announcement devices select to read the position information with strongest signal.

According to the method, the N train beacons are connected via network communication;

when the first train beacon receives the message of the fourth position change or the message of the fifth position change or the message of the sixth position change, the message of the fourth position change or the message of the fifth position change or the message of the sixth position change is sequentially transmitted and sent from a second train beacon to the Nth train beacon; or when each of the stop announcement devices receives two or more signals of the message of the fourth position change or the message of the fifth position change or the message of the sixth position change simultaneously, each of the stop announcement devices select to read the position information with strongest signal.

According to the method, the stop announcement device further judges the closest carriage exit of the transportation means from a destination, and sends a prompt message of the closest carriage exit of the transportation means from the destination according to a preset destination and the message of position change that is received currently; or a plurality of the stop announcement devices set an optimized collective destination, and sends a prompt message of the optimized collective destination according to the message of position change that is each received currently.

According to the method, the transportation means is a rail train or a railless train;

the stop site is a stop site of the transportation means disposed in an undersea tunnel.

According to the method, each of the platform beacons is disposed in each of the corresponding platform carriage zones;

each of the train beacons is disposed in each of the corresponding carriages;

each of the stop announcement devices is fixedly disposed on a communication device in each of the corresponding carriages; or each of the stop announcement devices is a mobile communication terminal;

the range of the preset communication distance is 20 to 40 meters.

According to the method, the platform beacon is 1.5 to 3 meters from the ground;

the train beacon is 1.5 to 3 meters from the ground of the carriage;

the platform beacon, the stop announcement device and the train beacon are all short range communication devices.

According to the method, the platform beacon is 2 meters from the ground;

the train beacon is 2 meters from the ground of the carriage;

the short range communication devices are radio frequency communication devices, RF communication devices, wifi communication devices, Bluetooth communication devices, and audio communication devices.

According to the method, the platform beacon, the stop announcement device and the train beacon are all Bluetooth communication devices;

the platform beacon is a platform Bluetooth beacon;

the train beacon is a carriage Bluetooth beacon.

By configuring a stop announcement system to comprise: at least one platform beacon disposed on at least one stop site of a transportation means for identifying a position message of the stop site, and sending a message of position change according to the position change of the transportation means relative to the stop site; and at least one stop announcement device disposed on the transportation means for receiving the message of position change and sending a corresponding stop announcement message when the transportation means moves into a range of a preset communication distance of the at least one platform beacon; wherein the stop announcement message at least comprises a prompt message of entering into the stop site and/or a prompt message of stopping on the stop site and/or a prompt message of leaving the stop site, the present invention achieves conveniently and timely allowing passengers to understand a mobile message of the transportation means, and allowing passengers to prepare to get off in advance, or judging how long to get off according to the obtained mobile message, and improves user experience. In particular, it is adapted to the transportation means that runs under the ground or in the undersea tunnel for a part of time and cannot accurately rely on satellite positioning and mobile communication network positioning in the prior art, and is adapted to the transportation means, such as, a rail train and a railless train, that runs on the ground and cannot accurately rely on satellite positioning and mobile communication network positioning in the prior art. Furthermore, it comprises the case of stop announcement that an underground railway train, and a train which often runs on the ground and enters into the ground, undersea and a tunnel under the mountain for a part of time stops in the undersea tunnel.

DETAILED DESCRIPTION OF THE INVENTION

In order to make the objectives, technical solutions and advantages of the present invention clearer, the present invention is further explained in connection with the drawings and examples. It shall be understood that the detailed embodiments described here are only used to explain the present invention, instead of defining the present invention.

Figure 1:
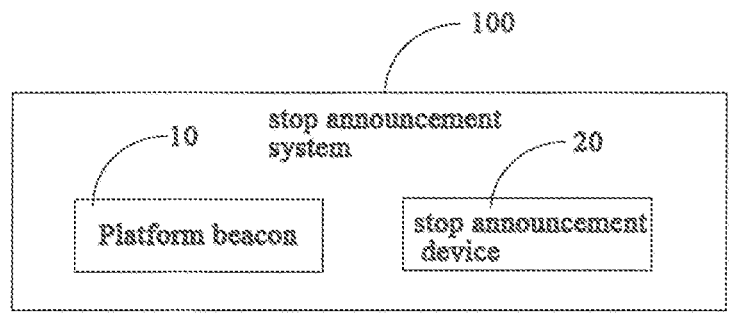
FIG. 1 is a formation diagram of a stop announcement system provided in one Example of the present invention.
Figure 2:
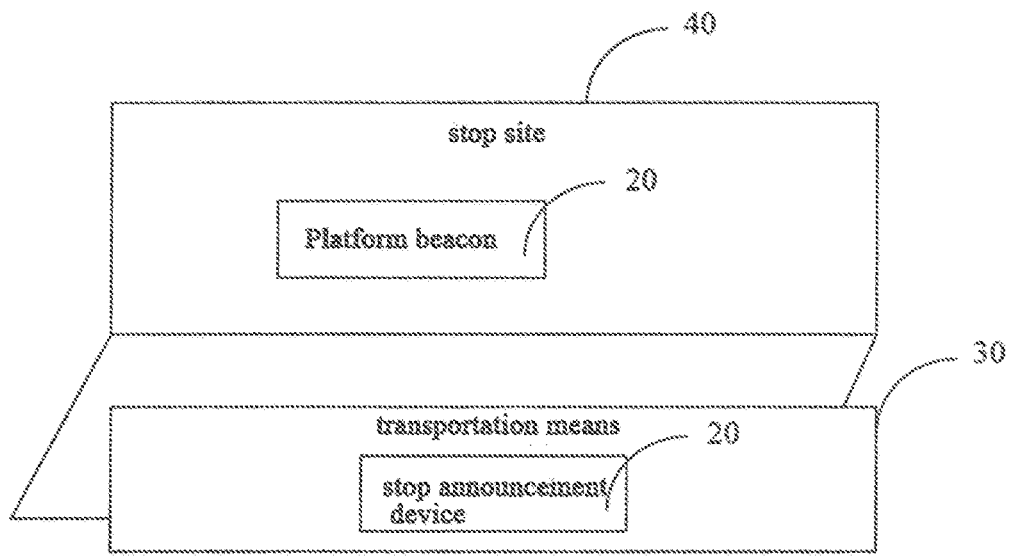
FIG. 2 is a structure diagram of respective devices of the stop announcement system provided in one Example of the present invention.

Referring to FIGS. 1 and 2, in one Example of the present invention, it provides a stop announcement system 100, comprising:

at least one platform beacon 10 disposed on at least one stop site 40 of transportation means 30 for identifying a position message of the stop site 40, and sending a message of position change according to the position change of the transportation means 30 relative to the stop site 40; and at least one stop announcement device 20 disposed on the transportation means 30 for receiving the message of position change and sending a corresponding stop announcement message when the transportation means 30 moves into a range of a preset communication distance of the at least one platform beacon 10;

wherein the stop announcement message at least comprises a prompt message of entering into the stop site 40 and/or a prompt message of stopping on the stop site 40 and/or a prompt message of leaving the stop site 40.

In this embodiment, the at least one platform beacon 10 is disposed on at least one stop site 40 of transportation means 30, and the platform beacon 10 identifies the position message of the stop site 40. If there are a plurality of stop sites, each of the stop site can be provided with one or more platform beacons 10, and the specific position message identified by each platform beacon 10 is different. When the transportation means 30 runs approaching the preset at least one stop site 40, according to the position change of the transportation means 30 relative to the stop site 40, it sends a message of position change, which varies according to the position change of the transportation means 30 relative to the stop site 40. For example, when the transportation means 30 approaches the stop site 40, it means that the transportation means 30 is arriving at the station, when the transportation means 30 stops on the stop site 40, it means that the transportation means 30 is on the station, and when the transportation means 30 leaves the stop site 40, it means that the transportation means 30 is leaving the station. Accordingly, after a stop announcement device 20 disposed on the transportation means acquires the message of these position changes, it sends the corresponding stop announcement message, such as, a prompt message that the transportation means 30 is entering into the stop site 40, a prompt message that the transportation means 30 stops on the stop site 40, a prompt message that the transportation means 30 leaves the stop site 40, and the like, such that the message of arriving at, stopping on and leaving the station can be accurately prompted to users who take the transportation means 30 to remind the users to make preparations in advance, such as, preparing to leave the transportation means 30 before arriving at the station. In addition, the transportation means 30 is preferably a long transportation means 30. Specifically, the transportation means 30 includes but not limited to a passenger train. The stop site 40 is, such as, a site in the undersea tunnel, and since the satellite positioning and the mobile communication network positioning of the prior art under the sea are not accurate and timely, when the transportation means 30 is relatively long, passengers in the rear of the transportation means 30 also can timely acquire the stop announcement message.

The stop announcement system 100 provided in the Example of the present invention is adapted to the transportation means 30 including a rail or railless train that runs under the ground or in the undersea tunnel for a part of time and cannot accurately rely on satellite positioning and mobile communication network positioning in the prior art, and is adapted to the transportation means 30 including a rail train and a rail short train, such as, a light rail, a tram or street car, and also including a railless train, that runs on the ground and cannot accurately rely on satellite positioning and mobile communication network positioning in the prior art. In one of use examples, it comprises an underground railway train, and a train that often runs on the ground and enters into the ground, undersea and a tunnel under the mountain for a part of time. In the Example of the present invention, one station, such as, a subway station, has a few of stop sites, which also can be called as platforms. For example, one simplest station has two stop sites (such as, two stop sites with opposite running directions), and a length of one stop site is a length of one subway train. Correspondingly, each carriage is called as a platform carriage zone, and N platform carriage zones form the stop site. Under normal circumstance, the two stop sites with opposite running directions are disposed alternatively on left and right sides of the same carriageway, but won't be vertically disposed on both sides of the carriageway, so the two stop sites have a certain distance, such that the platform beacon 10 is controllable and signal overlapping will not occur.

In one of the Examples, the transportation means is a rail train having a plurality of stations, each of which is formed of several stop sites. For example, Fuming station of Shenzhen subway is one of the stations, while Fuming station has four stop sites, wherein two stop sites are for use of Shenzhen line 4, another two stop sites are for use of Shenzhen line 7, and each stop site has a plurality of platform carriage zones, and has a length that can stop one subway train.

Figure 3:
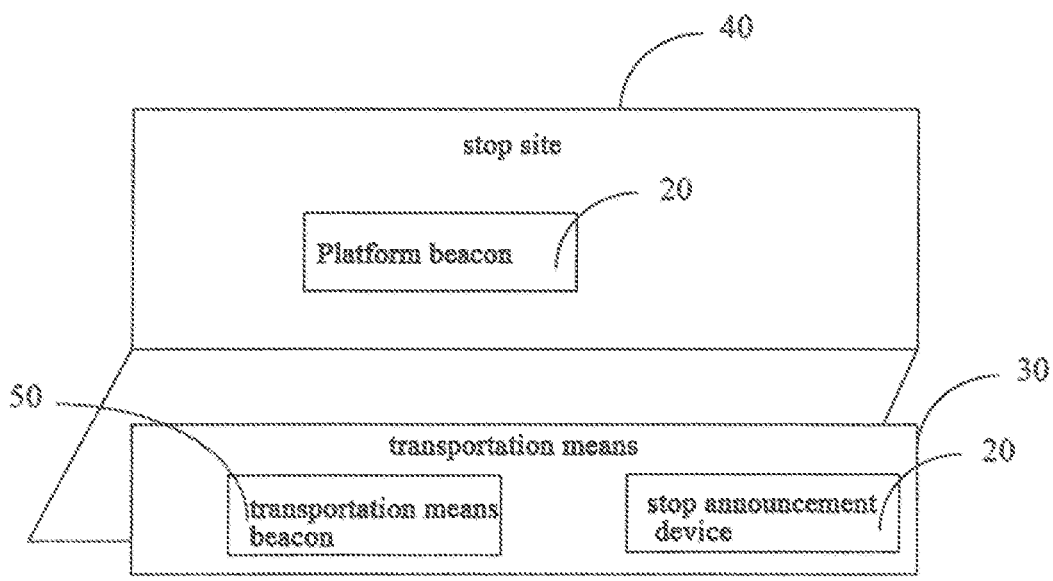
FIG. 3 is a structure diagram of respective devices of the stop announcement system provided in one Example of the present invention.
Figure 4:
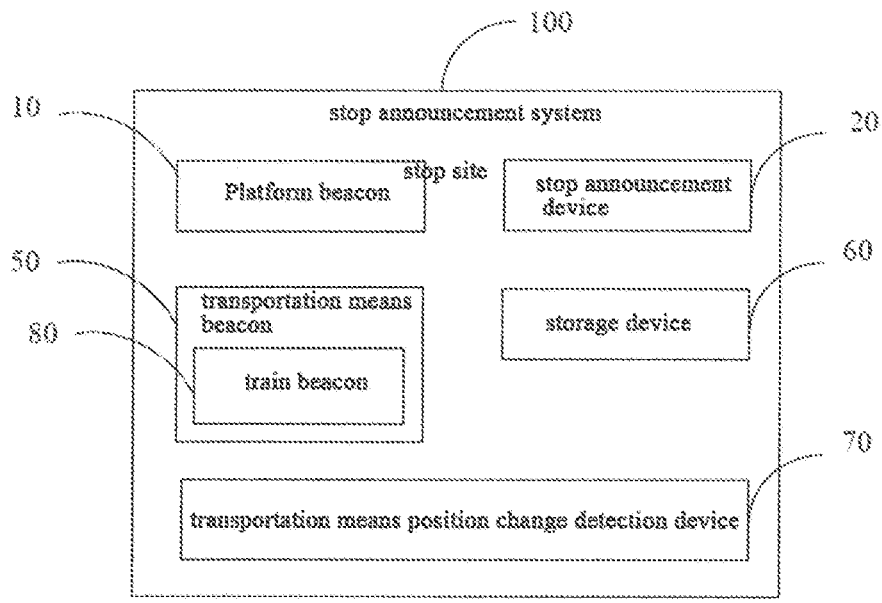
FIG. 4 is a formation diagram of the stop announcement system provided in one Example of the present invention.
Figure 5:
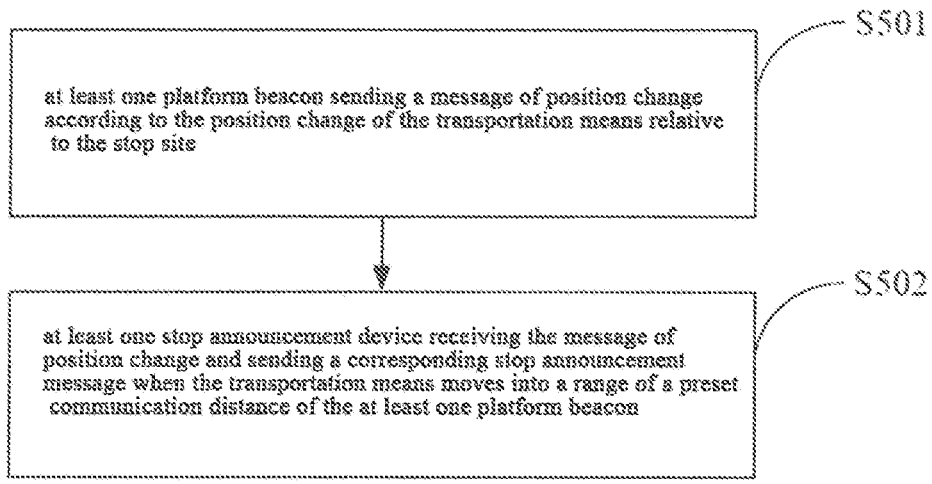
FIG. 5 is a flow diagram of a stop announcement method provided in one Example of the present invention.

Referring to FIG. 3, in one Example of the present invention, the stop announcement system 100 further comprises:

at least one transportation means beacon 50 disposed on the transportation means 30; the transportation means beacon 50 receiving the message of position change sent from the at least one platform beacon 10, and sending the message of position change to the at least one stop announcement device 20 when the transportation means 30 moves into the range of the preset communication distance of the at least one platform beacon 10.

It differs from the above Example in that the transportation means 30 is further provided with the transportation means beacon 50, and when the transportation means 30 moves into the range of the preset communication distance of the at least one platform beacon 10, the transportation means beacon 50 receives the message of position change sent from the at least one platform beacon 10, and then transfers it to one or more stop announcement devices 20 on the transportation means 30. The message of position change comprises current position message of the transportation means 30 and current position change of the transportation means 30, through which the specific stop site where the transportation means 30 stops, and a relative position of the transportation means 30 and the stop site 40 can be accurately notified to passengers who take the transportation means 30.

In one Example of the present invention, the transportation means 30 comprises N carriages; a first carriage to a Nth carriage are sequentially connected from a head to a tail of the transportation means 30; the stop announcement system 100 comprises:

a plurality of the stop announcement devices 20 respectively disposed in each of the carriages; the stop announcement devices 20 disposed in the first carriage to the Nth carriage being a first stop announcement device 20 to a Nth stop announcement device 20 sequentially;

the first stop announcement device 20 to the Nth stop announcement device 20 sequentially receiving a message of a first position change sent from the at least one platform beacon 10, and sending a prompt message of entering into the stop site 40 when the first carriage to the Nth carriage sequentially move into the range of the preset communication distance of the at least one platform beacon 10;

the first stop announcement device 20 to the Nth stop announcement device 20 sequentially receiving a message of a second position change sent from the at least one platform beacon 10, and sending a prompt message of stopping on the stop site 40 when the first carriage to the Nth carriage sequentially move into the range of the preset communication distance of the at least one platform beacon 10, and stop moving; and the first stop announcement device 20 to the Nth stop announcement device 20 sequentially receiving a message of a third position change sent from the at least one platform beacon 10, and sending a prompt message of leaving the stop site 40 when the first carriage to the Nth carriage continue to advance from a state of stopping moving to sequentially move out of the range of the preset communication distance of the at least one platform beacon 10.

In this Example, the transportation means 30 has a plurality of carriages, such as, N carriages. A first carriage, a second carriage, a third carriage, a fourth carriage . . . , and a Nth carriage are sequentially connected from an advancing direction to a tail of the transportation means 30. Moreover, at least one stop announcement device 20 is disposed in each of the carriages. The stop announcement devices 20 in the first carriage, the second carriage, the third carriage, the fourth carriage . . . , and the Nth carriage are respectively called as a first stop announcement device 20, a second stop announcement device 20, a third stop announcement device 20, a fourth stop announcement device 20 . . . , and a Nth stop announcement device 20. When the transportation means 30 advances, the first carriage to the Nth carriage sequentially move into the range of the preset communication distance of the at least one platform beacon 10. When each carriage arrives at the range of the preset communication distance of the at least one platform beacon 10, it means that the transportation means 30 is arriving at the station, and the first stop announcement device 20, the second stop announcement device 20, the third stop announcement device 20, the fourth stop announcement device 20 . . . , and the Nth stop announcement device 20 receive a message of a first position change sent from the at least one platform beacon 10, wherein the message of the first position change prompts a message of entering into the stop site 40. When the transportation means 30 stops moving and is in the range of the preset communication distance of the at least one platform beacon 10, it means that the transportation means 30 is stop on the station, and the first stop announcement device 20, the second stop announcement device 20, the third stop announcement device 20, the fourth stop announcement device 20 . . . , and the Nth stop announcement device 20 receive a message of a second position change sent from the at least one platform beacon 10, wherein the message of the second position change prompts a message of stopping on the stop site 40. When the transportation means 30 continues to advance from a state of stopping moving, and the first carriage, the second carriage, the third carriage, the fourth carriage . . . , and the Nth carriage sequentially move out of the range of the preset communication distance of the at least one platform beacon 10, the first stop announcement device 20, the second stop announcement device 20, the third stop announcement device 20, the fourth stop announcement device 20 . . . , and the Nth stop announcement device 20 sequentially receive a message of a third position change sent from the at least one platform beacon 10, wherein the message of the third position change prompts a message that the transportation means 30 leaves the stop site 40.

In one Example of the present invention, the at least one stop site 40 comprises N platform carriage zones, and comprises a first platform carriage zone to a Nth platform carriage zone sequentially connected from the head to the tail of the at least one stop site 40; the stop announcement system 100 comprises:

N platform beacons 10 respectively disposed in each of the platform carriage zones, each of the platform carriage zones having a length equal to a length of each of the carriages; the N platform beacons 10 being respectively a first platform beacon 10 to a Nth platform beacon 10; ranges of preset communication distances of the first platform beacon 10 to the Nth platform beacon 10 being respectively a range of a preset communication distance of the first platform beacon 10 to a range of a preset communication distance of the Nth platform beacon 10;

the first stop announcement device 20 to the Nth stop announcement device 20 sequentially and respectively receiving a message of a fourth position change sent from the corresponding Nth platform beacon 10 to first platform beacon 10, and correspondingly sending a prompt message of entering into the Nth platform carriage zone to the first platform carriage zone of the stop site 40 when the first carriage to the Nth carriage advance to sequentially pass the range of the preset communication distance of the Nth platform beacon to the range of the preset communication distance of the first platform beacon;

the first stop announcement device 20 to the Nth stop announcement device 20 sequentially and respectively receiving a message of a fifth position change sent from the corresponding Nth platform beacon 10 to first platform beacon 10, and correspondingly sending a prompt message of stopping on the Nth platform carriage zone to the first platform carriage zone of the stop site 40 when the first carriage to the Nth carriage advance to sequentially pass the range of the preset communication distance of the Nth platform beacon to the range of the preset communication distance of the first platform beacon, and stop moving; and the first stop announcement device 20 to the Nth stop announcement device 20 sequentially and respectively receiving a message of a sixth position change sent from the corresponding first platform beacon 10 to Nth platform beacon 10, and correspondingly sending a prompt message of leaving the first platform carriage zone to the Nth platform carriage zone of the stop site 40 when the first carriage to the Nth stop announcement device 20 sequentially continue to advance from the state of stopping moving to move out of the first platform carriage zone to the Nth platform carriage zone.

In this Example, it differs from the above Example in that the stop site 40 comprises a plurality of platform carriage zones, such as, N platform carriage zones, and comprises a first platform carriage zone to a Nth platform carriage zone sequentially connected from the head to the tail of the at least one stop site 40, wherein the advancing direction of the transportation means 30 is the head of the stop site 40. Accordingly, the stop announcement system 100 in this Example announces stops more accurately. It accurately notifies the passengers that it is the stop site 40 to be arrived, and also accurately notifies the passengers of which platform carriage zone of the stop site 40 to be arrived. At least one platform beacon 10 is disposed on each of the platform carriage zones. Ranges of preset communication distances of a first platform beacon 10, a second platform beacon 10, a third platform beacon 10 . . . , and a Nth platform beacon 10 are respectively a range of a preset communication distance of the first platform beacon 10, a range of a preset communication distance of the second platform beacon 10, a range of a preset communication distance of the third platform beacon 10 . . . , and a range of a preset communication distance of the Nth platform beacon 10. When the transportation means 30 advances, the first carriage to the Nth carriage sequentially pass the range of the preset communication distance of the first platform beacon 10 to the range of the preset communication distance of the Nth platform beacon 10 starting from the last platform carriage zone (i.e., the Nth platform carriage zone). The preset communication range of each platform beacon 10 is a range where the platform carriage zone is. For example, the range of the preset communication distance of the first platform beacon 10 is the range of the corresponding first platform carriage zone, and other ranges of the preset communication distances of the second platform beacon 10 to the Nth platform beacon 10 are similar. For example, when the transportation means 30 advances, the first carriage moves to the range of the preset communication distance of the (N−1)th platform beacon 10, and the second carriage moves to the range of the preset communication distance of the Nth platform beacon 10. At such moment, the first stop announcement device 20 in the first carriage receives the message of the fourth position change sent from the (N−1)th platform beacon 10, the second stop announcement device 20 in the second carriage receives the message of the fourth position change sent from the Nth platform beacon 10, and each message of the fourth position change comprises which stop site 40, and which platform carriage zone of the stop site 40 to be arrived currently. When the transportation means 30 continues to advance, and the first carriage moves to, such as, the (N−3)th platform carriage zone, the first stop announcement device 20 in the first carriage receives the message of the fourth position change sent from the (N−3)th platform beacon 10, and so on. When the transportation means 30 stops on the stop site 40, the first carriage to the Nth carriage respectively stop in the first platform carriage zone to the Nth platform carriage zone. The first stop announcement device 20 to the Nth stop announcement device 20 respectively receive the message of the fifth position change sent from the corresponding platform beacons 10 in the first platform carriage zone to the Nth platform carriage zone. For example, the first stop announcement device 20 receives the message of the fifth position change sent from the first platform beacon 10 in the first platform carriage zone. Each message of the fifth position change respectively prompts the first stop announcement device 20 to the Nth stop announcement device 20 which platform carriage zone of the stop site 40 to be stopped currently, etc. When the transportation means continues to advance to leave the stop site 40, the first carriage to the Nth carriage move away from the first platform carriage zone, and when beginning to move, the first stop announcement device 20 receives the message of the sixth position change sent from the first platform beacon 10 in the first platform carriage zone. The (N−1)th stop announcement device 20 receives the message of the sixth position change sent from the (N−1)th platform beacon 10 in the (N−1)th platform carriage zone. When the transportation means 30 continues to advance, the entire first carriage leaves the stop site, the second carriage enters into the range of the first platform carriage zone, the second carriage receives the message of the sixth position change sent from the first platform beacon 10, and so on. When each carriage passes different platform carriage zones, the stop announcement devices 20 in the carriages receive the message of the sixth position change sent from the platform beacons 10 in platform carriage zones to be arrived.

In one Example of the present invention, the at least one transportation means beacon 50 comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the first position change, the message of the second position change and the message of the third position change sent from the at least one platform beacon 10, and send the message of the first position change, the message of the second position change and the message of the third position change to the first stop announcement device 20 to the Nth stop announcement device 20 corresponding to the first carriage to the Nth carriage where the first train beacon to the Nth train beacon are located.

The at least one transportation means beacon 50 comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the fourth position change, the message of the fifth position change and the message of the sixth position change sent from the first platform beacon 10 to the Nth platform beacon 10, and send the message of the fourth position change, the message of the fifth position change and the message of the sixth position change to the first stop announcement device 20 to the Nth stop announcement device 20 corresponding to the first carriage to the Nth carriage where the first train beacon to the Nth train beacon are located.

In this Example, it differs from the above two Examples in that each of the plurality of carriages comprised by the transportation means 30 is provided with train beacons. The above messages of several position changes are correspondingly sent to the first train beacon to the Nth train beacon via the first platform beacon 10 to the Nth platform beacon 10, and then these messages are sent to the first stop announcement device 20 to the Nth stop announcement device 20 vai the first train beacon to the Nth train beacon. For example, when the transportation means 30 arrives at the station, and the first carriage arrives at the preset communication range of the first platform beacon 10, the first platform beacon 10 sends the message of the first position change to the first train beacon, and the first train beacon sends the message of the first position change to the first stop announcement device 20. Since the train beacon firstly receives the message of position change sent from the platform beacon 10, and then each train beacon transfers it to respective stop announcement devices 20 in their own carriages, the train beacons can be relay stations that emit signals, and the like, such that signal strength for sending messages can be improved. Preferably, each of the platform beacons 10 is disposed in each of the corresponding platform carriage zones; each of the train beacons is disposed in each of the corresponding carriages; each of the stop announcement devices 20 is fixedly disposed on a communication device in each of the corresponding carriages; or each of the stop announcement devices 20 is a mobile communication terminal; the range of the preset communication distance is 20 to 40 meters. Since this Example transfers the message of position change via the train beacon, it facilitates the respective stop announcement devices 20 to receive the message of position change, and in particular, in the case of more passengers in each carriage, if the stop announcement devices 20 are a plurality of mobile communication terminals, such as, mobile phones held by the passengers, it is convenient for the stop announcement devices 20 to send an arrival message to the multiple passengers.

In one Example of the present invention, the message of position change comprises current position message of the transportation means 30 and current position change of the transportation means 30; the position message comprises a platform beacon short range communication signal of the platform beacon 10;

the stop announcement system 100 further comprises:

a storage device 60 for storing a database of platform beacon 10; the database of platform beacon 10 database comprising record for each platform beacon 10 with the unique identification of the said platform beacon 10 and the corresponding station and platform identification, name and the zone position with the platform. Further the database may contain the longitude, latitude and the height above sea level of the said platform beacon 10. For example, a record in the said database may store the logical position of a particular platform beacon may be installed at the eighth platform carriage zone of the third stop site of HK Admiralty station in Hong Kong. Accordingly, the prompt message sent from the stop announcement device 20 comprises the corresponding stop site, and the name and/or geographic position of the platform carriage zone that are searched.

a transportation means position change detection device 70 for detecting a position change of the transportation means 30 relative to the stop site; the position change comprises slowing down to the range of the preset communication distance of the platform beacon 10, stopping in the range of the preset communication distance of the platform beacon 10, and speeding up to leave the range of the preset communication distance of the platform beacon 10. The transportation means position change detection device 70 comprises at least one speed sensor, through which the position change of the transportation means 30 relative to the stop site is detected. The transportation means position change detection device 70 may comprise multiple ones respectively disposed in each of the carriages, through which the position change of the carriage relative to the platform carriage zone is detected. For example, the transportation means position change detection device 70 in the first carriage detects that the carriage is slowing down to the range of the preset communication distance of the first platform beacon 10. Alternatively, the entire transportation means 30 is only provided with one transportation means position change detection device 70, through which the transportation means 30 is detected by a state of the platform beacon, such as, stopping in the range of the preset communication distance of the third platform beacon 10 of one stop site of Admiralty station.

after the stop announcement device 20 receives the position message, the corresponding stop site, and the name and/or geographic position of the platform carriage zone are searched in the platform beacon 10 database according to the platform beacon short range communication signal; when the transportation means position change detection device 70 detects the position change to slowing down to the range of the preset communication distance of the platform beacon 10, a prompt message of entering into the stop site 40 is sent; or when the transportation means position change detection device 70 detects the position change to stopping in the range of the preset communication distance of the platform beacon 10, a prompt message of stopping on the stop site 40 is sent; or when the transportation means position change detection device 70 detects the position change to speeding up to leave the range of the preset communication distance of the platform beacon 10, a prompt message of leaving the stop site 40 is sent; the above three types of prompt messages enable the passengers to clearly understand the specific position of the transportation means 30, or the carriage of the transportation means 30 relative to the stop site 40, thereby preparing to get off. Moreover, in the above several Examples, N is an integer greater than and equal to 2.

In one Example of the present invention, the storage device 60 further stores a train beacon database of the train beacon; the train beacon database comprises a train short range communication signal corresponding to the train beacon, and name of a train carriage corresponding to the train short range communication signal. Therefore, on the other hand, the prompt message sent from the stop announcement device 20 may further comprise the name of the train carriage where the stop announcement device 20 is.

The storage device 60 is disposed in the platform beacon 10, or disposed in the stop announcement device 20. When the storage device 60 is disposed in the stop announcement device 20, the stop announcement device 20 searches the platform beacon database or the train beacon database according to the received, such as, platform beacon short range communication signal, or train short range communication signal to acquire the corresponding stop site and name of the platform carriage zone or name of the carriage. Of course, the transportation means position change detection device 70 is disposed in the platform beacon 10, or disposed in the train beacon to detect the position change of the transportation means 30 or specifically each carriage relative to the stop site or the platform carriage zone.

In one Example of the present invention, the N train beacons are connected via network communication;

when the first train beacon receives the message of the first position change or the message of the second position change or the message of the third position change, the message of the first position change or the message of the second position change or the message of the third position change is sequentially transmitted and sent from a second train beacon to the Nth train beacon. Since the N train beacons are connected via network communication, after the first train beacon receives the message of the first position change or the message of the second position change or the message of the third position change, these messages can be sequentially transmitted through the N train beacons connected via network communication. For example, when the first train beacon receives the message of the first position change, the message of the first position change is sent to the first stop announcement device 20 while sending the message of the first position change to the second train beacon. After the second train beacon receives the message of the first position change, the message of the first position change is sent to the second stop announcement device 20 while sending the message of the first position change to the third train beacon, and so on, such that passengers in the respective carriages of the transportation means 30 will rapidly acquire relevant stop announcement message. But the prompt messages sent from the stop announcement devices 20 in the respective carriages are slightly different. For example, when the first carriage just enters into the range of the second platform beacon 10, the prompt message sent from the stop announcement device 20 in the first carriage is that the first carriage enters into the second platform carriage zone, and the prompt message sent from the stop announcement device 20 in the second carriage is that the first carriage enters into the second platform carriage zone, and this carriage enters into the first platform carriage zone, similarly as described.

In addition, when each of the stop announcement devices 20 receives two or more signals of the message of the first position change or the message of the second position change or the message of the third position change simultaneously, each of the stop announcement devices 20 select to read the position message with strongest signal. Since the ranges of the preset communication distances of a plurality of train beacons in the carriages may overlap, when the stop announcement devices 20 receive two or more signals of the messages of the position changes simultaneously, it selects to receive the strongest signal. In one embodiment of the present invention, the platform beacon 10 is 1.5 to 3 meters from the ground; the train beacon is 1.5 to 3 meters from the ground of the carriage; and the platform beacon 10, the stop announcement device 20 and the train beacon 80 are all short range communication devices. Preferably, the platform beacon 10 is 2 meters from the ground; the train beacon is 2 meters from the ground of the carriage; and the short range communication devices are radio frequency communication devices, RF communication devices, wifi communication devices, Bluetooth communication devices, and audio communication devices, such as, sound wave communication devices or ultrasonic wave communication devices.

In one Example of the present invention, the N train beacons are connected via network communication;

when the first train beacon receives the message of the fourth position change or the message of the fifth position change or the message of the sixth position change, the message of the fourth position change or the message of the fifth position change or the message of the sixth position change is sequentially transmitted and sent from a second train beacon to the Nth train beacon; or when each of the stop announcement devices 20 receives two or more signals of the message of the fourth position change or the message of the fifth position change or the message of the sixth position change simultaneously, each of the stop announcement devices 20 select to read the position message with strongest signal. This Example is similar with the above Example in operation, but only the transmitted message is the message of the fourth position change or the message of the fifth position change or the message of the sixth position change.

In one Example of the present invention, the stop announcement device 20 further judges the closest carriage exit of the transportation means 30 from a destination, and sends a prompt message of the closest carriage exit of the transportation means 30 from the destination according to a preset destination and the message of position change that is received currently; or a plurality of the stop announcement devices 20 set an optimized collective destination, and sends a prompt message of the optimized collective destination according to the message of position change that is each received currently. By the operation way provided in this Example, the passengers can conveniently move to the closer carriage door from the destination, or several passengers at positions of different carriages agree to meet at the position of one carriage to allow the passengers to more fewer distance.

In one Example of the present invention, preferably, the platform beacon 10, the stop announcement device 20 and the train beacon 80 are all Bluetooth communication devices; the platform beacon 10 is a platform Bluetooth beacon; and the train beacon 80 is a carriage Bluetooth beacon. In order to provide local data service, the present invention sends broadcast and a transportation message using a short range wireless communication device, may provide a short range communication device including a low power short range communication device, comprises a radio frequency communication device that may comprise RF communication, wifi communication, and Bluebooth communication, and also may be audio communication including sound wave communication and ultrasonic wave communication. Selection of these communication methods is to utilize its characteristics, including short effective communication distance, and limiting communication ranges due to obstacles, and these characteristics facilitate determining accuracy of local site information, i.e., no error announcement due to large effective communication range to allow nearby transportation means to receive arrival service that shall not be received. In order to simplify discussion, the short range wireless communication device is preferred to be a Bluetooth device, but it is not limited to use the Bluetooth device as the short range communication device.

The effective communication distance for Bluetooth 3.0 or Bluetooth 4.0 device may be approximately 100 meters. In order to facilitate explanation, take a length of each carriage to be 22 to 22 meters for example, Bluetooth beacon is adjusted to an effective communication distance roughly greater than a length of one carriage, i.e., a radius of the effective communication distance is about 20 to 40 meters. Due to limitation of walls or other obstacles, the effective communication distance may be a half round, a rectangle and the like. Other short range communication device also may calibrate the effective communication distance to be 20 to 40 meters.

As for Bluetooth labels (UUID, Major ID, Minor) of the Bluetooth device, the Bluetooth device discussed in the Example of the present invention comprises the platform beacon 10, the train beacon 80 and the stop announcement device 20, such as, Bluetooth components on the passengers' mobile smart devices. When the short range communication device is a non-Bluetooth device, including wifi device, and near field communication (NFC) device, each device has a unique communication label, including LID of the NFC.

In one Example of the present invention, the stop announcement system 100 comprises the platform beacon 10, the stop announcement device 20 and/or the train beacon 80, which are all Bluetooth devices. Every two of the Bluetooth devices from no communication connection to communication connection is called as initiating connection program. According to one of discovery and connection protocols, in below discussion, according to different methods, it is applied to that the platform beacon 10 on the platform carriage zone establishes a communication connection with the train beacons 80 from far to near, the platform beacon 10 on the platform carriage zone establishes a communication connection with the stop announcement devices 20, such as, mobile smart devices having Bluetooth components, of the passengers within the train from far to near, or the train beacon on the train establishes a communication connection with Bluetooth components of the mobile smart devices of the passengers who prepare to get on the train from far to near:

a. Two Bluetooth devices, particularly comprising one Bluetooth device disposed on the running train and one Bluetooth device disposed on the stop site. Since the train does not approach the stop site, in particular, due to separation of tunnel walls, the two Bluetooth devices do not enter into an effective communication range of the opposite side, and do not have communication connection;

b. Inquiry program: the two Bluetooth devices enter into an inquiry program, and send an inquiry message including sending a Bluetooth label of the Bluetooth device which is making inquiry and/or other information of the Bluetooth devices during the inquiry program;

c. Paging program: when one Bluetooth device receives the inquiry message, and determines to be a connectable Bluetooth device, entering into a paging program, and after the Bluetooth device receiving the inquiry message determines to be a communication object, sending a paging message including a Bluetooth label (i.e., address of a message receiving device) of the original Bluetooth device which sends the inquiry message, a Bluetooth label of the Bluetooth device which responds the message, and/or other information of the Bluetooth devices;

d. Connection program: the two Bluetooth devices, wherein in particular, one is the platform beacon 10, and the other is the train beacon 80, complete the paging program, i.e., they have exchanged the Bluetooth labels and determine the opposite side to be communication objects. That is, they establish connection.

Since electronic components and communication components of the two Bluetooth devices are different in functions and efficiencies, time required for completing the above discovery and connection protocol is different. In one of the embodiments, it takes about two seconds to complete programs of the whole protocol starting from the two Bluetooth devices enter into the effective communication range of the opposite side. When the embodiment of the present invention uses a non-Bluetooth short range communication device, initiation of the short range communication connection program may be different, and steps are substantially the same.

In one Example of the present invention, it provides a method of implementing stop announcement using the above stop announcement system 100, comprising:

at least one platform beacon 10 sending information of position change according to the position change of the transportation means 30 relative to the stop site 40; and at least one stop announcement device 20 receiving the message of position change and sending a corresponding stop announcement message when the transportation means 30 moves into a range of a preset communication distance of the at least one platform beacon 10;

wherein the stop announcement message at least comprises a prompt message of entering into the stop site 40 and/or a prompt message of stopping on the stop site 40 and/or a prompt message of leaving the stop site 40.

In this Example, at least one platform beacon 10 is disposed on at least one stop site 40 of the transportation means 30, and the platform beacon 10 identifies the position change of the stop site 40. If there are a plurality of stop sites, each stop site may be provided with one or more platform beacons 10, and the specific position message identified by each platform beacon 10 is different. When the transportation means 30 runs approaching the preset at least one stop site 40, according to the position change of the transportation means 30 relative to the stop site 40, it sends the message of position change, which varies according to the position change of the transportation means 30 relative to the stop site 40. After a stop announcement device 20 disposed on the transportation means acquires the message of these position changes, it sends the corresponding stop announcement message, such as, a prompt message that the transportation means 30 is entering into the stop site 40, a prompt message that the transportation means 30 stops on the stop site 40, a prompt message that the transportation means 30 leaves the stop site 40, and the like, such that the message of arriving at, stopping on and leaving the station can be accurately prompted to users who take the transportation means 30 to remind the users to make preparations in advance. In particular, it is adapted to a rail or railless train, and the case that the stop site 40 is disposed in the undersea tunnel.

In one Example of the present invention, the stop announcement system 100 further comprises: at least one transportation means beacon disposed on the transportation means 30;

the method further comprises:

the transportation means beacon receiving the message of position change sent from the at least one platform beacon 10, and sending the message of position change to the at least one stop announcement device 20 when the transportation means 30 moves into the range of the preset communication distance of the at least one platform beacon 10.

In one Example of the present invention, the transportation means 30 comprises N carriages; a first carriage to a Nth carriage are sequentially connected from a head to a tail of the transportation means 30; the stop announcement system comprises:

a plurality of the stop announcement devices 20 respectively disposed in each of the carriages; the stop announcement devices 20 disposed in the first carriage to the Nth carriage being a first stop announcement device 20 to a Nth stop announcement device 20 sequentially;

in the method: the first stop announcement device 20 to the Nth stop announcement device 20 sequentially receiving a message of a first position change sent from the at least one platform beacon 10, and sending a prompt message of entering into the stop site 40 when the first carriage to the Nth carriage sequentially move into the range of the preset communication distance of the at least one platform beacon 10;

the first stop announcement device 20 to the Nth stop announcement device 20 sequentially receiving a message of a second position change sent from the at least one platform beacon 10, and sending a prompt message of stopping on the stop site 40 when the first carriage to the Nth carriage sequentially move into the range of the preset communication distance of the at least one platform beacon 10, and stop moving; and the first stop announcement device 20 to the Nth stop announcement device 20 sequentially receiving a message of a third position change sent from the at least one platform beacon 10, and sending a prompt message of leaving the stop site 40 when the first carriage to the Nth carriage continue to advance from a state of stopping moving to sequentially move out of the range of the preset communication distance of the at least one platform beacon 10.

In one Example of the present invention, the at least one stop site 40 comprises N platform carriage zones, and comprises a first platform carriage zone to a Nth platform carriage zone sequentially connected from the head to the tail of the at least one stop site 40; the stop announcement system further comprises:

N platform beacons 10 respectively disposed in each of the platform carriage zones, each of the platform carriage zones having a length equal to a length of each of the carriages; the N platform beacons 10 being respectively a first platform beacon 10 to a Nth platform beacon 10; ranges of preset communication distances of the first platform beacon 10 to the Nth platform beacon 10 being respectively a range of a preset communication distance of the first platform beacon 10 to a range of a preset communication distance of the Nth platform beacon 10;

the method comprises:

the first stop announcement device 20 to the Nth stop announcement device 20 sequentially and respectively receiving a message of a fourth position change sent from the corresponding Nth platform beacon 10 to first platform beacon 10, and correspondingly sending a prompt message of entering into the Nth platform carriage zone to the first platform carriage zone of the stop site 40 when the first carriage to the Nth carriage advance to sequentially pass the range of the preset communication distance of the Nth platform beacon to the range of the preset communication distance of the first platform beacon;

the first stop announcement device 20 to the Nth stop announcement device 20 sequentially and respectively receiving a message of a fifth position change sent from the corresponding Nth platform beacon 10 to first platform beacon 10, and correspondingly sending a prompt message of stopping on the Nth platform carriage zone to the first platform carriage zone of the stop site 40 when the first carriage to the Nth carriage advance to sequentially pass the range of the preset communication distance of the Nth platform beacon to the range of the preset communication distance of the first platform beacon, and stop moving; and the first stop announcement device 20 to the Nth stop announcement device 20 sequentially and respectively receiving a message of a sixth position change sent from the corresponding first platform beacon 10 to Nth platform beacon 10, and correspondingly sending a prompt message of leaving the first platform carriage zone to the Nth platform carriage zone of the stop site 40 when the first carriage to the Nth stop announcement device sequentially continue to advance from the state of stopping moving to move out of the first platform to the Nth platform.

Figure 6A:
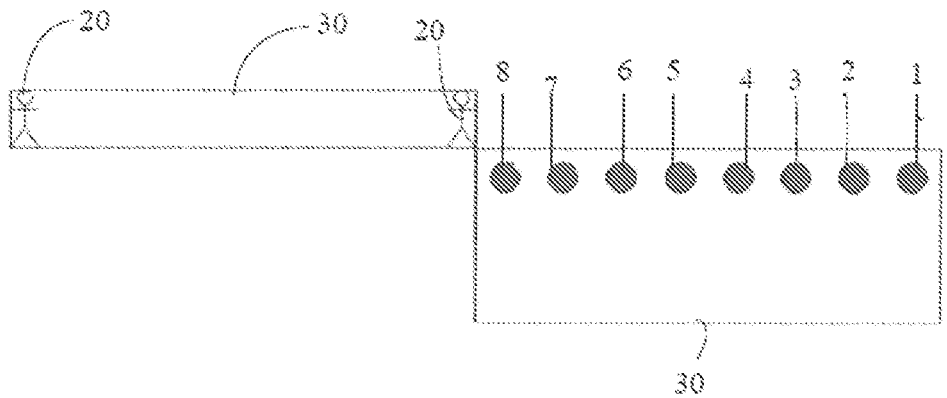
FIG. 6A is an exemplary diagram of application of the stop announcement system provided in one Example of the present invention.
Figure 6B:
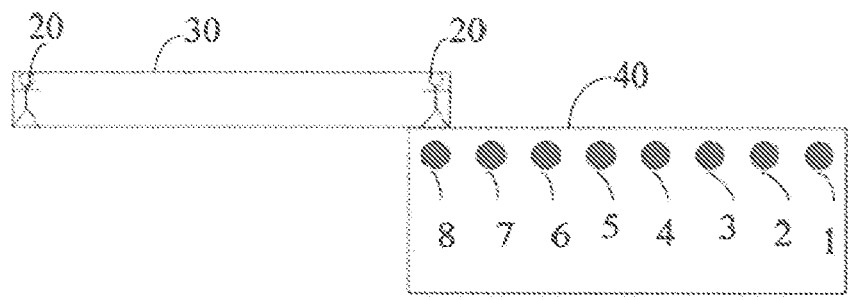
FIG. 6B is an exemplary diagram of application of the stop announcement system provided in one Example of the present invention.
Figure 6C:
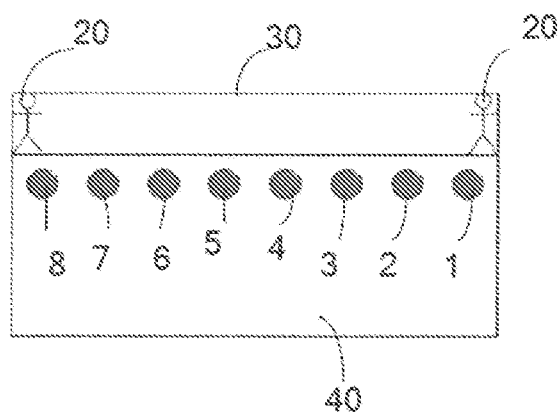
FIG. 6C is an exemplary diagram of application of the stop announcement system provided in one Example of the present invention.

Referring to FIGS. 6A-6C, in this Example, the transportation means 30 is a train, and the method is as follows:

1. The train is slowing down before entering into the stop site, which is a part of operation of the train, a plurality of mobile smart devices (i.e., stop announcement devices 20) of multiple passengers in the train are provided with short range communication devices and operation programs, and a passenger mobile message is (a code of the previous stop site, leaving the station) and keeping the inquiry program.

2. When the train enters into the stop site, and the head of the train has just entered into the stop site, a time t is 0 second.

3. The train keeps advancing and continues to slow down, the first mobile smart devices (i.e., the first stop announcement devices 20) of the first passengers enter into a communication range of the platform beacon 8, completes the short range communication discovery and connection protocol, and receives a short range communication label of the platform beacon 8 which indicates that the train has entered into the stop site, and a time t is a short range communication initiation and connection time. In one of the embodiments, the short range communication initiation and connection time is 2 seconds, i.e., the time t is be 2 seconds. The first mobile smart devices search to acquire codes of the stop site and the platform carriage zone in the database with the received short range communication label of the platform beacon 8.

4. The passenger mobile message is updated to (the code of the stop site obtained in step 3, and arriving at the station).

5. The train continues to slow down to advance until the first carriage arrives at the stop site, and the other end stops completely. Finally, when the train advances, the plurality of eighth mobile smart devices of the multiple eighth passengers in the eighth carriage enter into the effective communication range of the platform beacon 8, and repeat the above programs of the first mobile smart devices (i.e., the first stop announcement devices 20) to acquire that it has entered into the stop site;

6. Since the eighth passengers entering into the effective communication range of the platform beacon 8 is later than the first passengers entering into the effective communication range of the platform beacon 8 for about a time that the train enters into the platform, i.e., about 28 seconds in one embodiment.

Preferably, the method also may provide the updated passenger mobile message, and the method further comprises:

7. The passengers in the carriages are in continuous connection with the platform beacon, wherein after the passengers in the first carriage are initially in connection with the platform beacon 1, since the train does not stop, and continues to slowly drive to the end of the platform, i.e., a right end in FIG. 6A, the first mobile smart devices of the first passengers are sequentially in connection with the platform beacons 8, 7, 6, 5 and so on until the train stops, and connection between the first mobile smart devices and the platform beacon 1 is terminated. When the train completes the above on and off programs of the passengers, the train continues to advance to the right of FIG. 6A, and the short range communication components of the first mobile smart devices will be far away from the platform beacon 1 to go beyond the effective communication range. After the first mobile smart devices lose connection with the signal of the platform beacon 1, and determine to leave the platform, the passenger mobile message is updated to (the code of the stop site obtained in step 3, and leaving the station).

8. Firstly, the mobile smart devices of the passengers in other carriages are in connection with the platform beacons, such as, steps 1-4. When the train slows down and stops, the mobile smart devices keep in connection with one of the platform beacons 1 to 8 until the train continues to drive to the right, and the mobile smart devices continue to advance to be finally in communication connection with the platform beacon 1, leave, lose the connection with the signal of the platform beacon 1, and determine to leave the platform as stated in step 7, and the passenger mobile message is updated to (the code of the stop site obtained in step 3, and leaving the station).

Since time for the first passengers, the second passengers and the eighth passengers to leave the platform beacon 1 is different, a time determining to leave the station is different.

In one Example of the present invention, the at least one beacon of transportation means 30 that comprises N train with beacons respectively disposed in the first carriage to the Nth carriage correspondingly and being respectively a first train beacon to a Nth train beacon; a range of a preset communication distance of each of the train beacons is a range of size of the carriage where the train beacon is located;

in the method: the first train beacon to the Nth train beacon respectively receive the message of the first position change, the message of the second position change and the message of the third position change sent from the at least one platform beacon 10, and send the message of the first position change, the message of the second position change and the message of the third position change to the first stop announcement device 20 to the Nth stop announcement device 20 corresponding to the first carriage to the Nth carriage where the first train beacon to the Nth train beacon are located. That is, the messages of the several position changes received from the respective platform beacons 10 are transferred to the stop announcement devices 20 via the respective train beacons.

In one Example of the present invention, the at least one transportation means 30 is installed with N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the fourth position change, the message of the fifth position change and the message of the sixth position change sent from the first platform beacon 10 to the Nth platform beacon 10, and send the message of the fourth position change, the message of the fifth position change and the message of the sixth position change to the first stop announcement device 20 to the Nth stop announcement device 20 corresponding to the first carriage to the Nth carriage where the first train beacon to the Nth train beacon are located. That is, the messages of the several position changes received from the respective platform beacons 10 are transferred to the stop announcement devices 20 via the respective train beacons. The train beacons may be each independently mounted on the top of the train carriage, and comprise power supply devices including batteries or connected to an external power supply system, and the train beacons are provided with network connection devices. Preferably, the train beacons comprise antennas and repeaters connecting to a plurality of short range communication signals.

In one Example of the present invention, the message of position change comprises current position message of the transportation means 30 and current position change of the transportation means 30; the position message comprises a platform beacon short range communication signal of the platform beacon 10; the stop announcement system 100 further comprises:

a storage device 60 for storing platform beacon 10 database of the platform beacon 10; the platform beacon 10 database comprising a stop site corresponding to the platform beacon short range communication signal, and name and/or geographic position of the platform carriage zone; and a transportation means position change detection device 70 for detecting a position change of the transportation means 30 relative to the stop site; the position change comprises slowing down to the range of the preset communication distance of the platform beacon 10, stopping in the range of the preset communication distance of the platform beacon 10, and speeding up to leave the range of the preset communication distance of the platform beacon 10;

in the method after the stop announcement device 20 receives the position message, the corresponding stop site, and the name and/or geographic position of the platform carriage zone are searched in the platform beacon 10 database according to the platform beacon short range communication signal; when the transportation means 30 position change detection device detects the position change to slowing down to the range of the preset communication distance of the platform beacon 10, a prompt message of entering into the stop site 40 is sent; or when the transportation means 30 position change detection device detects the position change to stopping in the range of the preset communication distance of the platform beacon 10, a prompt message of stopping on the stop site 40 is sent; or when the transportation means 30 position change detection device detects the position change to speeding up to leave the range of the preset communication distance of the platform beacon 10, a prompt message of leaving the stop site 40 is sent;

wherein the prompt messages all comprise the corresponding stop site, and the name and/or geographic position of the platform carriage zone that are searched;

N is an integer greater than and equal to 2.

According to the method, the storage device 60 further stores a train beacon database of the train beacon; the train beacon database comprises a train short range communication signal corresponding to the train beacon, and name of a train carriage corresponding to the train short range communication signal; the storage device 60 is disposed in the platform beacon 10, or disposed in the stop announcement device 20; the transportation means position change detection device 70 is disposed in the platform beacon 10, or disposed in the train beacon.

In one Example of the present invention, in order to preferably provide the transportation means 30, for example, the train beacons in the carriages of the train are communicated with the mobile smart devices (stop announcement devices 20) of the passengers, each carriage may be provided with a plurality of train beacons. Although the short range communication labels are different, they also may represent the same carriage of the same train in the train beacon database. In another embodiment, a single train beacon also can be used while using a plurality of antennas and short range communication signal repeaters to effectively cover the entire carriage. Still further, the train beacon is provided with one or more short range communication devices. In one of the embodiments, the short range communication and the platform beacons of one train are matched, and the train beacons have the second short range communication devices to match with the mobile smart devices of the passengers in the train. That is, communication of the platforms and the train and communication of the train and the passengers may separately select suitable communication ways. In addition to one or two short range communication devices, the train beacon is provided with control components including microcontrollers or microcomputers for performing logics of testing, searching the platform beacon database, updating and sending the passenger mobile message, etc.

According to the method, the N train beacons are connected via network communication;

when the first train beacon receives the message of the first position change or the message of the second position change or the message of the third position change, the message of the first position change or the message of the second position change or the message of the third position change is sequentially transmitted and sent from a second train beacon to the Nth train beacon; or when the first train beacon receives the message of the fourth position change or the message of the fifth position change or the message of the sixth position change, the message of the fourth position change or the message of the fifth position change or the message of the sixth position change is sequentially transmitted and sent from a second train beacon to the Nth train beacon.

Figure 7A:
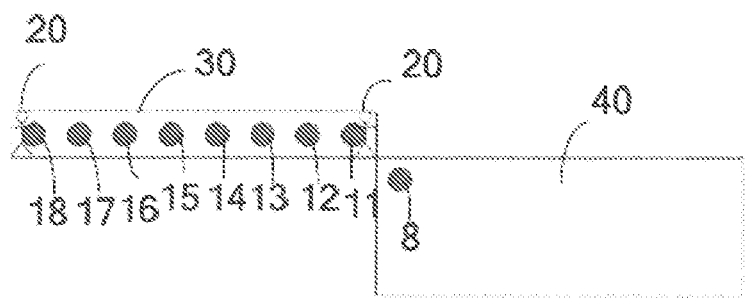
FIG. 7A is an exemplary diagram of application of the stop announcement system provided in one Example of the present invention.

Referring to FIG. 7A, in one Example of the present invention, the transportation means 30 is a train, and one carriage short range communication beacon (i.e., train beacon) is disposed in each carriage of the train. A short range communication beacon mounted in the first carriage is the train beacon 11, a short range communication beacon mounted in the second carriage is the train beacon 12, and so on. A short range communication beacon mounted in the eighth carriage is the train beacon 18, and the eight train beacons in the same train form a network. A network topology may be a mesh network, i.e., in one of the embodiments, the train beacon 11 is connected to the train beacon 12 via the network, the train beacon 12 is connected to the train beacons 11 and 13 via the network, the train beacon 13 is connected to the train beacons 12 and 14 via the network, the train beacon 14 is connected to the train beacons 13 and 15 via the network, the train beacon 15 is connected to the train beacons 14 and 16 via the network, the train beacon 6 is connected to the train beacons 5 and 7 via the network, the train beacon 7 is connected to the train beacons 6 and 8 via the network, and the train beacon 18 is connected to the train beacon 17 via the network, thereby forming a communicated network with total eight train beacons. In another embodiment, the network topology may be a bus network, and a connection is provided in the train to connect all train beacons. The network connection comprises wired connection, Bluetooth communication and other wireless communication.

In one Example of the present invention, when each of the stop announcement devices 20 receives two or more signals of the message of the first position change or the message of the second position change or the message of the third position change simultaneously, each of the stop announcement devices 20 select to read the position message with strongest signal. When each of the stop announcement devices 20 receives two or more signals of the message of the fourth position change or the message of the fifth position change or the message of the sixth position change simultaneously, each of the stop announcement devices 20 select to read the position message with strongest signal. In the above method, since the effective communication ranges of the two train beacons may overlap, the passengers' mobile smart devices may receive messages of the two adjacent train beacons simultaneously, and the above method may further select one train beacon with strongest short range communication signal for connection.

In one Example of the present invention, the stop announcement device 20 further judges the closest carriage exit of the transportation means 30 from a destination, and sends a prompt message of the closest carriage exit of the transportation means 30 from the destination according to a preset destination and the message of position change that is received currently; or a plurality of the stop announcement devices 20 set an optimized collective destination, and sends a prompt message of the optimized collective destination according to the message of position change that is each received currently.

In the above Example, by virtue of the obtained train carriage position, except showing on the smart mobile devices, the passengers may be assisted to remind the exit of the preset station to get off, and move to the carriage position in advance. For example, if the passenger prepares to get off at one station, and prepares to go to exit C, and the exit closest to C after arrival is the fourth platform carriage zone of the stop site, the passenger's smart mobile device may remind the passenger to go forward, backward or stay in the original carriage to prepare to get off according to the carriage position at present. In another scenario, when two passengers want to meet in the carriage, a meeting place may be agreed according to the carriage positions shown on the two mobile smart devices of the two passengers. In addition, the present invention can provide another method to provide data of preferred information to passengers in different carriages, and the provided data comprises communicated carriage positions of the smart mobile devices of the passengers, i.e., it can notify that the passenger is in one carriage of the train.

Figure 7B:
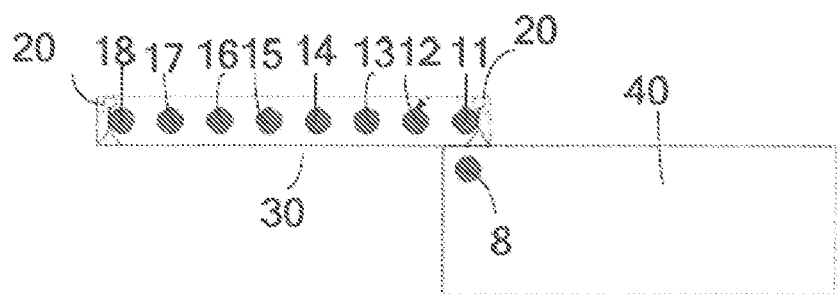
FIG. 7B is an exemplary diagram of application of the stop announcement system provided in one Example of the present invention.

In one Example of the present invention, the embodiment shown in FIG. 7B is provided with eight train beacons on the train, and the platform still has eight platform beacons (FIG. 7B only shows the platform beacon 8). In this Example, the method is as follows:

1. The train is slowing down before entering into the stop site, which is a part of operation of the train, a plurality of train beacons in the train keep communication with mobile smart devices (i.e., stop announcement devices 20) of multiple passengers in the train, and a passenger mobile message is (a code of the previous stop site, and leaving the station), while the train beacons keep the inquiry program;

2. When the train enters into the stop site, and the head of the train has just entered into the stop site, a time t is 0 second;

3. The train keeps advancing and continues to slow down, the train beacon 1 enters into the communication range of the platform beacon 8, completes the short range communication discovery and connection protocol, and receives a short range communication label of the platform beacon 8 to acquire that the train has entered into the stop site, and a time t is a short range communication initiation and connection time. In one of the embodiments, the short range communication initiation and connection time is 2 seconds, i.e., the time t is be 2 seconds. The train beacon 1 searches to acquire codes of the stop site and the platform in the database with the received short range communication label of the platform beacon 8.

4. The control devices of the train beacons update the passenger mobile message to (the code of the stop site obtained in step 3, and arriving at the station).

5. The train beacon 1 sends the passenger mobile message to the first mobile devices of one or more passengers in the carriage 1. The train beacon 1 sends the passenger mobile message to other train beacons (train beacons 12, 13, 14, 15, 16, 17 and 18) simultaneously through the train beacon network.

6. After the remaining train beacons receive the passenger mobile message, the plurality of train beacons send the passenger mobile message to the plurality of mobile devices in the plurality of carriages.

7. In one of the embodiments, when the train beacon network is a mesh network, the train beacon 18 receives the passenger mobile message at the latest, and the time t is the longest train beacon message delay. In one of the embodiments, the longest train beacon message delay is 7 seconds, i.e., when the train beacon 18 receives the message of entering into the platform, t is 7+2 seconds. Generally, the longest train beacon message delay is shorter than the time that the train enters into the platform, i.e., when the train beacon 18 receives the message of entering into the platform, the train still does not stop, and the eighth carriage of the train still does not leave the tunnel.

8. In another preferable embodiment, when the train beacon network is a bus network, the train beacon 18 and the remaining train beacons receive the message of entering into the platform at roughly the same time. In one of the embodiments, a time difference of entering into the platform acquired by the train beacon 11 and the remaining train beacons is less than 1 second.

In this method, by virtue of the characteristic that the train beacons transmit the passenger mobile message, while message transmission is faster than training driving, the passengers in the eighth carriage still have plenty of time to obtain the notification of getting off in advance.

Further, the present invention further provides message that the train is on and leaving the station. When the train stops completely, the train beacon 18 and the platform beacon 8 are in each communication range, other train beacon 11 and the platform beacon 1 are in each communication range, and the train beacon 2 and the platform beacon 2 are in each communication range, etc. Each short range communication label in the platform beacons is different, and the short range communication labels of all platform beacons and the positions of the platforms are recorded in the platform beacon database, i.e., positions of the platform beacons can be searched in the database.

Referring to FIGS. 7A and 7B, in one preferable method of the present invention, the method further comprises:

9. The train continues to advance, and the eighth carriage enters into the platform slowly, establishes communication with the initial platform beacon, i.e., it establishes communication with the platform beacon 8, receives the short range communication label of the platform beacon 8, and determines the platform beacon in communication connection to be the platform beacon 8 in the platform beacon database. The platform beacon 8 keeps the inquiry program.

10. After determining to be connected to the platform beacon 8, the train beacons update the passenger mobile message to (the code of platform obtained in step 3, and arriving at the station).

11. The platform beacon 18 sends the updated passenger mobile message to the eighth mobile devices of one or more eighth passengers in the carriage 8. The platform beacon 18 sends the passenger mobile message to other train beacons (train beacons 11, 12, 13, 14, 15, 16 and 17) simultaneously through the train beacon network.

12. After the remaining train beacons receive the passenger mobile message, the plurality of train beacons send the passenger mobile message to the plurality of mobile devices in the plurality of carriages.

13. The passenger mobile message received by passenger's mobile smart devices is stopping on the station, and shown on the mobile smart devices.

14. After the train completes on and off programs of the passengers, the train begins to leave the platform, and the train continues to advance to the right to drive out of the stop site, as shown in the figures of the specification of the present invention.

15. The train beacon 18 leaves the communication range of the platform beacon 8, and enters into the communication range of the platform beacon 7. In the case that the communication ranges of the platform beacons 7 and 8 may overlap, when the train beacon 18 keeps the inquiry program to test a signal of a new platform beacon, and searches in the platform beacon database to acquire to have received a signal of the next platform beacon, it means that the train has moved for about a distance of one carriage (or longer or shorter), which represents that the train has initiated the program of leaving the platform. The train beacons update the passenger mobile message to be (the code of the stop site obtained in step 3, and leaving the station).

16. The train beacon 18 sends the updated passenger mobile message to the eighth mobile devices of one or more eighth passengers in the carriage 8. The train beacon 18 sends the passenger mobile message to other train beacons (train beacons 11, 12, 13, 14, 15, 16 and 17) simultaneously through the train beacon network.

17. After the remaining train beacons receive the passenger mobile message, the plurality of train beacons send the passenger mobile message to the plurality of mobile devices in the plurality of carriages.

18. In one of the embodiments, other train beacons including the train beacons 1, 2, and the like cause different delay time due to different structures of the train beacon network, as explicitly explained in step 6 or 7.

The train beacon Bluetooth labels on the train are further stored in the train beacon database, and programs of the mobile smart devices of the passengers in the train are provided with, or are connectable to the train beacon database. When a passenger enters into the train, and makes communication connection with the train beacon in the train, a Bluetooth label of the train beacon is acquired during the connection, and a carriage position in communication connection now is searched in the train beacon database using the Bluetooth label. The passenger can perform other application according to the carriage position obtained from the smart mobile device.

In one Example of the present invention, it may further provides the following method using the stop announcement system 100:

1. After the passenger and the smart mobile device (i.e., the stop announcement device 20) enter into the carriage, the Bluetooth component of the mobile smart device initiates a connection program with the train beacon, and obtains the Bluetooth label of the train beacon.

2. The program of the passenger's smart mobile device searches in the train beacon database using the obtained Bluetooth label of the train beacon to obtain the carriage position of the train beacon in the train.

The program of the passenger's smart mobile device shows that the carriage position of the train beacon, or is further used for other use.

The above method further comprises that when the passenger and the mobile device move in the train from one carriage to another carriage, the mobile smart device continues to perform the connection program to connect the message to another train beacon, and change the carriage position data shown on the mobile smart device.

In conclusion, By configuring a stop announcement system to comprise: at least one platform beacon disposed on at least one stop site of a transportation means for identifying a position message of the stop site, and sending a message of position change according to the position change of the transportation means relative to the stop site; and at least one stop announcement device disposed on the transportation means for receiving the message of position change and sending a corresponding stop announcement message when the transportation means moves into a range of a preset communication distance of the at least one platform beacon; wherein the stop announcement message at least comprises a prompt message of entering into the stop site and/or a prompt message of stopping on the stop site and/or a prompt message of leaving the stop site, the present invention achieves conveniently and timely allowing passengers to understand a mobile message of the transportation means, and allowing passengers to prepare to get off in advance, or judging how long to get off according to the obtained mobile message, and improves user experience. In particular, it is adapted to the transportation means that runs under the ground or in the undersea tunnel for a part of time and cannot accurately rely on satellite positioning and mobile communication network positioning in the prior art, and is adapted to the transportation means, such as, a rail train and a railless train, that runs on the ground and cannot accurately rely on satellite positioning and mobile communication network positioning in the prior art. Furthermore, it comprises the case of stop announcement that an underground railway train, and a train which often runs on the ground and enters into the ground, undersea and a tunnel under the mountain for a part of time stops in the undersea tunnel.

Of course, the present invention may further have other multiple examples, and those skilled in the art shall make various corresponding modifications and variations according to the present invention without departing from the spirit and substance of the present invention. However, these corresponding modifications and variations shall be covered by the protection scope of the appended claims in the present application.

What is claimed is:

1. A stop announcement system, comprising:
at least one platform beacon disposed on at least one stop site of a transportation means for identifying a position message of the stop site
the at least one platform beacon capable of sending a message of position change according to the position change of the transportation means relative to the stop site; and
at least one stop announcement device disposed on the transportation means for receiving the message of position change and sending a corresponding stop announcement message when the transportation means moves into a range of a preset communication distance of the at least one platform beacon;
wherein the stop announcement message at least comprises a prompt message of entering into the stop site and/or a prompt message of stopping on the stop site and/or a prompt message of leaving the stop site; and
at least one transportation means beacon disposed on the transportation means; the transportation means beacon receiving the message of position change sent from the at least one platform beacon, and sending the message of position change to the at least one stop announcement device when the transportation means moves into the range of the preset communication distance of the at least one platform beacon;
wherein the transportation means comprises N carriages; a first carriage to a Nth carriage are sequentially connected from a head to a tail of the transportation means; the stop announcement system comprises:
a plurality of the stop announcement devices respectively disposed in each of the carriages; the stop announcement devices disposed in the first carriage to the Nth carriage being a first stop announcement device to a Nth stop announcement device sequentially;
the first stop announcement device to the Nth stop announcement device sequentially receiving a message of a first position change sent from the at least one platform beacon, and sending a prompt message of entering into the stop site when the first carriage to the Nth carriage sequentially move into the range of the preset communication distance of the at least one platform beacon;
the first stop announcement device to the Nth stop announcement device sequentially receiving a message of a second position change sent from the at least one platform beacon, and sending a prompt message of stopping on the stop site when the first carriage to the Nth carriage sequentially move into the range of the preset communication distance of the at least one platform beacon, and stop moving; and
the first stop announcement device to the Nth stop announcement device; sequentially receiving a message of a third position change sent from the at least one platform beacon, and sending a prompt message of leaving the stop site when the first carriage to the Nth carriage continue to advance from a state of stopping moving to sequentially move out of the range of the preset communication distance of the at least one platform beacon.

2. The stop announcement system according to claim 1, wherein the at least one stop site comprises N platform carriage zones, and comprises a first platform carriage zone to a Nth platform carriage zone sequentially connected from the head to the tail of the at least one stop site; the stop announcement system comprises:
N platform beacons respectively disposed in each of the platform carriage zones, each of the platform carriage zones having a length equal to a length of each of the carriages; the N platform beacons being respectively a first platform beacon to a Nth platform beacon; ranges of preset communication distances of the first platform beacon to the Nth platform beacon being respectively a range of a preset communication distance of the first platform beacon to a range of a preset communication distance of the Nth platform beacon;

the first stop announcement device to the Nth stop announcement device sequentially and respectively receiving a message of a fourth position change sent from the corresponding Nth platform beacon to first platform beacon, and correspondingly sending a prompt message of entering into the Nth platform carriage zone to the first platform carriage zone of the stop site when the first carriage to the Nth carriage advance to sequentially pass the range of the preset communication distance of the Nth platform beacon to the range of the preset communication distance of the first platform beacon;

the first stop announcement device to the Nth stop announcement device sequentially and respectively receiving a message of a fifth position change sent from the corresponding Nth platform beacon to first platform beacon, and correspondingly sending a prompt message of stopping on the Nth platform carriage zone to the first platform carriage zone of the stop site when the first carriage to the Nth carriage advance to sequentially pass the range of the preset communication distance of the Nth platform beacon to the range of the preset communication distance of the first platform beacon, and stop moving; and the first stop announcement device to the Nth stop announcement device sequentially and respectively receiving a message of a sixth position change sent from the corresponding first platform beacon to Nth platform beacon, and correspondingly sending a prompt message of leaving the first platform carriage zone to the Nth platform carriage zone of the stop site when the first carriage to the Nth stop announcement device sequentially continue to advance from the state of stopping moving to move out of the first platform carriage zone to the Nth platform carriage zone.

3. The stop announcement system according to claim 1, wherein the at least one transportation means beacon comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the first position change, the message of the second position change and the message of the third position change sent from the at least one platform beacon, and send the message of the first position change, the message of the second position change and the message of the third position change to the first stop announcement device to the Nth stop announcement device corresponding to the first carriage to the Nth carriage where the first train beacon to the Nth train beacon are located.

4. The stop announcement system according to claim 2, wherein the at least one transportation means beacon comprises N train beacons respectively disposed in the first carriage to the Nth carriage correspondingly and being respectively a first train beacon to a Nth train beacon; a range of a preset communication distance of each of the train beacons is a range of size of the carriage where the train beacon is located;

the first train beacon to the Nth train beacon respectively receive the message of the fourth position change, the message of the fifth position change and the message of the sixth position change sent from the first platform beacon to the Nth platform beacon, and send the message of the fourth position change, the message of the fifth position change and the message of the sixth position change to the first stop announcement device to the Nth stop announcement device corresponding to the first carriage to the Nth carriage where the first train beacon to the Nth train beacon are located.

5. The stop announcement system according to claim 3 or 4, wherein the message of position change comprises current position message of the transportation means and current position change of the transportation means; the position message comprises a platform beacon short range communication signal of the platform beacon;

the stop announcement system further comprises:

a storage device for storing a platform beacon database of the platform beacon; the platform beacon database comprising a stop site corresponding to the platform beacon short range communication signal, and name and/or geographic position of the platform carriage zone; and a transportation means position change detection device for detecting a position change of the transportation means relative to the stop site; the position change comprises slowing down to the range of the preset communication distance of the platform beacon, stopping in the range of the preset communication distance of the platform beacon, and speeding up to leave the range of the preset communication distance of the platform beacon;

wherein after the stop announcement device receives the position message, the corresponding stop site, and the name and/or geographic position of the platform carriage zone are searched in the platform beacon database according to the platform beacon short range communication signal; when the transportation means position change detection device detects the position change to slowing down to the range of the preset communication distance of the platform beacon, a prompt message of entering into the stop site is sent; or when the transportation means position change detection device detects the position change to stopping in the range of the preset communication distance of the platform beacon, a prompt message of stopping on the stop site is sent; or when the transportation means position change detection device detects the position change to speeding up to leave the range of the preset communication distance of the platform beacon, a prompt message of leaving the stop site is sent;

wherein the prompt messages all comprise the corresponding stop site, and the name and/or geographic position of the platform carriage zone that are searched;

N is an integer greater than and equal to 2.

6. The stop announcement system according to claim 5, wherein the storage device further stores a train beacon database of the train beacon; the train beacon database comprises a train short range communication signal corresponding to the train beacon, and name of a train carriage corresponding to the train short range communication signal;

the storage device is disposed in the platform beacon, or disposed in the stop announcement device;

the transportation means position change detection device is disposed in the platform beacon, or disposed in the train beacon.

7. The stop announcement system according to claim 3, wherein the N train beacons are connected via network communication;
   when the first train beacon receives the message of the first position change or the message of the second position change or the message of the third position change, the message of the first position change or the message of the second position change or the message of the third position change is sequentially transmitted and sent from a second train beacon to the Nth train beacon; or
   when each of the stop announcement devices receives two or more signals of the message of the first position change or the message of the second position change or the message of the third position change simultaneously, each of the stop announcement devices select to read the position information with strongest signal.

8. The stop announcement system according to claim 4, wherein the N train beacons are connected via network communication;
   when the first train beacon receives the message of the fourth position change or the message of the fifth position change or the message of the sixth position change, the message of the fourth position change or the message of the fifth position change or the message of the sixth position change is sequentially transmitted and sent from a second train beacon to the Nth train beacon; or
   when each of the stop announcement devices receives two or more signals of the message of the fourth position change or the message of the fifth position change or the message of the sixth position change simultaneously, each of the stop announcement devices select to read the position information with strongest signal.

9. The stop announcement system according to claim 5, wherein the stop announcement device further judges the closest carriage exit of the transportation means from a destination, and sends a prompt message of the closest carriage exit of the transportation means from the destination according to a preset destination and the message of position change that is received currently; or
   a plurality of the stop announcement devices set an optimized collective destination, and sends a prompt message of the optimized collective destination according to the message of position change that is each received currently.

10. The stop announcement system according to claim 5, wherein the transportation means is a rail train or a railless train;
   the stop site is a stop site of the transportation means disposed in an undersea tunnel.

11. The stop announcement system according to claim 5, wherein each of the platform beacons is disposed in each of the corresponding platform carriage zones;
   each of the train beacons is disposed in each of the corresponding carriages;
   each of the stop announcement devices is fixedly disposed on a communication device in each of the corresponding carriages; or
   each of the stop announcement devices is a mobile communication terminal;
   the range of the preset communication distance is 20 to 40 meters.

12. The stop announcement system according to claim 11, wherein the platform beacon is 1.5 to 3 meters from the ground;
   the train beacon is 1.5 to 3 meters from the ground of the carriage;
   the platform beacon, the stop announcement device and the train beacon are all short range communication devices.

13. The stop announcement system according to claim 12, wherein the platform beacon is 2 meters from the ground;
   the train beacon is 2 meters from the ground of the carriage;
   the short range communication devices are radio frequency communication devices, RF communication devices, wifi communication devices, Bluetooth communication devices, and audio communication devices.

14. The stop announcement system according to claim 13, wherein the platform beacon, the stop announcement device and the train beacon are all Bluetooth communication devices;
   the platform beacon is a platform Bluetooth beacon;
   the train beacon is a carriage Bluetooth beacon.

15. A stop position announcement system comprising:
   a plurality of platform beacons capable of being installed on a train station platform; wherein
   the plurality of platform beacons is capable of:
   a) establishing communication connection with smart mobile devices within a pre-determined range of the platform beacon; and
   b) issuing a message to the smart mobile devices within the pre-determined range, the message indicating a location on the train station platform; such that
   smart mobile devices carried by the carriage of a train into the pre-determined range is able to receive the message while the smart mobile devices remain within the pre-determined range;
   the plurality of platform beacons spaced on the train station platform such that the pre-determined range of each platform beacon is limited to reach a respective carriage of a train when the train is fully parked within the station, and carriages adjacent the respective carriage is beyond the pre-determined range.

16. A stop position announcement system as claimed in claim 15, wherein
   smart mobile devices carried by the carriage of a train out of the pre-determined range stops being able to receive the message.

17. A stop position announcement system as claimed in claim 15, wherein the smart mobile devices are the smart phones of train passengers.

* * * * *